(12) United States Patent
Lys et al.

(10) Patent No.: US 7,135,824 B2
(45) Date of Patent: Nov. 14, 2006

(54) SYSTEMS AND METHODS FOR CONTROLLING ILLUMINATION SOURCES

(75) Inventors: Ihor A. Lys, Milton, MA (US); Frederick M. Morgan, Quincy, MA (US); Michael K. Blackwell, Milton, MA (US); Alfred D. Ducharme, Orlando, FL (US)

(73) Assignee: Color Kinetics Incorporated, Boston, MA (US)

( * ) Notice: Subject to any disclaimer, the term of this patent is extended or adjusted under 35 U.S.C. 154(b) by 34 days.

(21) Appl. No.: 10/916,018

(22) Filed: Aug. 11, 2004

(65) Prior Publication Data

US 2005/0062440 A1    Mar. 24, 2005

Related U.S. Application Data

(63) Continuation of application No. 10/174,499, filed on Jun. 17, 2002, now Pat. No. 6,975,079, and a continuation-in-part of application No. 09/971,367, filed on Oct. 4, 2001, now Pat. No. 6,788,011, which is a continuation of application No. 09/669,121, filed on Sep. 25, 2000, now Pat. No. 6,806,659, which is a continuation of application No. 09/425,770, filed on Oct. 22, 1999, now Pat. No. 6,150,774, said application No. 10/174,499 and a continuation-in-part of application No. 09/870,193, filed on May 30, 2001, now Pat. No. 6,608,453, and a continuation-in-part of application No. 09/215,624, filed on Dec. 17, 1998, now Pat. No. 6,528,954, , said application No. 10/174,499 and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, and a continuation-in-part of application No. 09/333,739, filed on Jun. 15, 1999, and a continuation-in-part of application No. 09/815,418, filed on Mar. 22, 2001, now Pat. No. 6,577,080, is a continuation of application No. 09/213,548, filed on Dec. 17, 1998, now Pat. No. 6,166,496, said application No. 10/174,499 and a continuation-in-part of application No. 10/045,604, filed on Oct. 23, 2001, , said application No. 10/174,499 and a continuation-in-part of application No. 09/989,747, filed on Nov. 20, 2001, now Pat. No. 6,897,624, and a continuation-in-part of application No. 09/989,677, filed on Nov. 20, 2001.

(60) Provisional application No. 60/301,692, filed on Jun. 28, 2001, provisional application No. 60/328,867, filed on Oct. 12, 2001, provisional application No. 60/328,867, filed on Oct. 12, 2001, provisional application No. 60/341,476, filed on Oct. 30, 2001, provisional application No. 60/068,792, filed on Dec. 24, 1997, provisional application No. 60/078,861, filed on Mar. 20, 1998, provisional application No. 60/079,285, filed on Mar. 25, 1998, provisional application No. 60/090,920, filed on Jun. 26, 1998, provisional application No. 60/277,911, filed on Mar. 22, 2001, provisional application No. 60/242,484, filed on Oct. 23, 2000, provisional application No. 60/262,022, filed on Jan. 16, 2001, provisional application No. 60/262,153, filed on Jan. 17, 2001, provisional application No. 60/268,259, filed on Feb. 13, 2001, provisional application No. 60/252,004, filed on Nov. 20, 2000, provisional application No. 60/296,219, filed on Jun. 6, 2001, provisional application No. 60/298,471, filed on Jun. 15, 2001.

(51) Int. Cl.
*G05F 1/00* (2006.01)

(52) U.S. Cl. .................. 315/292; 315/294; 315/318; 315/362; 711/100; 711/202; 711/221

(58) Field of Classification Search ............ 315/291, 315/292, 294, 312, 362, 318; 345/38, 39, 345/48, 77, 82–84, 214, 532; 348/671, 673–675, 348/716–721, 801–803; 341/138–140, 144; 711/100, 115, 202, 212, 221
See application file for complete search history.

(56) References Cited

U.S. PATENT DOCUMENTS

| | | |
|---|---|---|
| 2,909,097 A | 10/1959 | Alden et al. |
| 3,318,185 A | 5/1967 | Kott |
| 3,561,719 A | 2/1971 | Grindle |
| 3,586,936 A | 6/1971 | McLeroy |
| 3,601,621 A | 8/1971 | Ritchie |
| 3,643,088 A | 2/1972 | Osteen et al. |
| 3,746,918 A | 7/1973 | Drucker et al. |
| 3,818,216 A | 6/1974 | Larraburu |
| 3,832,503 A | 8/1974 | Crane |
| 3,858,086 A | 12/1974 | Anderson et al. |
| 3,909,670 A | 9/1975 | Wakamatsu et al. |
| 3,924,120 A | 12/1975 | Cox, III |
| 3,958,885 A | 5/1976 | Stockinger et al. |
| 3,974,637 A | 8/1976 | Bergey et al. |
| 4,001,571 A | 1/1977 | Martin |
| 4,054,814 A | 10/1977 | Fegley et al. |
| 4,070,568 A | 1/1978 | Gala |
| 4,082,395 A | 4/1978 | Donato et al. |
| 4,096,349 A | 6/1978 | Donato |
| 4,241,295 A | 12/1980 | Williams, Jr. |
| 4,271,408 A | 6/1981 | Teshima et al. |
| 4,272,689 A | 6/1981 | Crosby et al. |
| 4,273,999 A | 6/1981 | Pierpoint |
| 4,298,869 A | 11/1981 | Okuno |
| 4,329,625 A | 5/1982 | Nishizawa et al. |
| 4,367,464 A | 1/1983 | Kurahashi et al. |
| 4,388,567 A | 6/1983 | Yamazaki et al. |
| 4,388,589 A | 6/1983 | Molldrem, Jr. |
| 4,392,187 A | 7/1983 | Bornhorst |
| 4,420,711 A | 12/1983 | Takahashi et al. |
| 4,500,796 A | 2/1985 | Quin |
| 4,597,033 A | 6/1986 | Meggs et al. |
| 4,622,881 A | 11/1986 | Rand |
| 4,625,152 A | 11/1986 | Nakai |
| 4,635,052 A | 1/1987 | Aoike et al. |
| 4,647,217 A | 3/1987 | Havel |
| 4,656,398 A | 4/1987 | Michael et al. |
| 4,668,895 A | 5/1987 | Schneiter |
| 4,682,079 A | 7/1987 | Sanders et al. |
| 4,686,425 A | 8/1987 | Havel |
| 4,687,340 A | 8/1987 | Havel |
| 4,688,154 A | 8/1987 | Nilssen |
| 4,688,869 A | 8/1987 | Kelly |
| 4,695,769 A | 9/1987 | Schweickardt |
| 4,701,669 A | 10/1987 | Head et al. |
| 4,705,406 A | 11/1987 | Havel |
| 4,707,141 A | 11/1987 | Havel |
| 4,727,289 A | 2/1988 | Uchida |
| 4,740,882 A | 4/1988 | Miller |
| 4,753,148 A | 6/1988 | Johnson |
| 4,771,274 A | 9/1988 | Havel |
| 4,780,621 A | 10/1988 | Bartleucci et al. |
| 4,794,383 A | 12/1988 | Havel |
| 4,818,072 A | 4/1989 | Mohebban |
| 4,824,269 A | 4/1989 | Havel |
| 4,837,565 A | 6/1989 | White |
| 4,843,627 A | 6/1989 | Stebbins |
| 4,845,481 A | 7/1989 | Havel |
| 4,845,745 A | 7/1989 | Havel |
| 4,857,801 A | 8/1989 | Farrell |
| 4,863,223 A | 9/1989 | Weissenbach et al. |
| 4,874,320 A | 10/1989 | Freed et al. |
| 4,887,074 A | 12/1989 | Simon et al. |
| 4,922,154 A | 5/1990 | Cacoub |
| 4,926,268 A * | 5/1990 | Kawamura et al. .......... 358/3.1 |
| 4,934,852 A | 6/1990 | Havel |
| 4,962,687 A | 10/1990 | Belliveau et al. |
| 4,965,561 A | 10/1990 | Havel |
| 4,973,835 A | 11/1990 | Kurosu et al. |
| 4,979,081 A | 12/1990 | Leach et al. |
| 4,980,806 A | 12/1990 | Taylor et al. |
| 4,992,704 A | 2/1991 | Stinson |
| 5,003,227 A | 3/1991 | Nilssen |
| 5,008,595 A | 4/1991 | Kazar |
| 5,008,788 A | 4/1991 | Palinkas |
| 5,010,459 A | 4/1991 | Taylor et al. |
| 5,027,262 A | 6/1991 | Freed |
| 5,034,807 A | 7/1991 | Von Kohorn |
| 5,036,248 A | 7/1991 | McEwan et al. |
| 5,038,255 A | 8/1991 | Nishihashi et al. |
| 5,072,216 A | 12/1991 | Grange |
| 5,078,039 A | 1/1992 | Tulk et al. |
| 5,083,063 A | 1/1992 | Brooks |
| 5,122,733 A | 6/1992 | Havel |
| 5,126,634 A | 6/1992 | Johnson |
| 5,128,595 A | 7/1992 | Hara |
| 5,130,909 A | 7/1992 | Gross |
| 5,134,387 A | 7/1992 | Smith et al. |
| 5,142,199 A | 8/1992 | Elwell |
| 5,154,641 A | 10/1992 | McLaughlin |
| 5,164,715 A | 11/1992 | Kashiwabara et al. |
| 5,184,114 A | 2/1993 | Brown |
| 5,194,854 A | 3/1993 | Havel |
| 5,196,924 A * | 3/1993 | Lumelsky et al. .......... 348/674 |
| 5,209,560 A | 5/1993 | Taylor et al. |
| 5,225,765 A | 7/1993 | Callahan et al. |
| 5,226,723 A | 7/1993 | Chen |
| 5,254,910 A | 10/1993 | Yang |
| 5,256,948 A | 10/1993 | Boldin et al. |
| 5,278,542 A | 1/1994 | Smith et al. |
| 5,282,121 A | 1/1994 | Bornhorst et al. |
| 5,283,517 A | 2/1994 | Havel |
| 5,294,865 A | 3/1994 | Haraden |
| 5,298,871 A | 3/1994 | Shimohara |
| 5,307,295 A | 4/1994 | Taylor et al. |
| 5,329,431 A | 7/1994 | Taylor et al. |
| 5,350,977 A | 9/1994 | Hamamoto et al. |
| 5,357,170 A | 10/1994 | Luchaco et al. |
| 5,371,618 A | 12/1994 | Tai et al. |
| 5,374,876 A | 12/1994 | Horibata et al. |
| 5,375,043 A | 12/1994 | Tokunaga |
| 5,381,074 A | 1/1995 | Rudzewicz et al. |
| 5,388,357 A | 2/1995 | Malita |
| 5,392,431 A | 2/1995 | Pfisterer |
| 5,402,702 A | 4/1995 | Hata |
| 5,404,282 A | 4/1995 | Klinke et al. |
| 5,406,176 A | 4/1995 | Sugden |
| 5,410,328 A | 4/1995 | Yoksza et al. |
| 5,412,284 A | 5/1995 | Moore et al. |
| 5,412,552 A | 5/1995 | Fernandes |
| 5,420,482 A | 5/1995 | Phares |
| 5,421,059 A | 6/1995 | Leffers, Jr. |
| 5,432,408 A | 7/1995 | Matsuda et al. |
| 5,436,535 A | 7/1995 | Yang |
| 5,436,853 A | 7/1995 | Shimohara |
| 5,450,301 A | 9/1995 | Waltz et al. |
| 5,461,188 A | 10/1995 | Drago et al. |
| 5,463,280 A | 10/1995 | Johnson |
| 5,465,144 A | 11/1995 | Parker et al. |
| 5,475,300 A | 12/1995 | Havel |
| 5,481,657 A * | 1/1996 | Schubert et al. ............. 345/418 |
| 5,489,827 A | 2/1996 | Xia |
| 5,491,402 A | 2/1996 | Small |
| 5,493,183 A | 2/1996 | Kimball |
| 5,504,395 A | 4/1996 | Johnson et al. |
| 5,519,496 A | 5/1996 | Borgert et al. |
| 5,545,950 A | 8/1996 | Cho |
| 5,559,681 A | 9/1996 | Duarte |
| 5,561,346 A | 10/1996 | Byrne |
| 5,575,459 A | 11/1996 | Anderson |
| 5,575,554 A | 11/1996 | Guritz |
| 5,592,051 A | 1/1997 | Korkala |

| | | | | | | |
|---|---|---|---|---|---|---|
| 5,612,710 A * | 3/1997 | Christensen et al. .......... 345/30 | | 6,577,080 B1 | 6/2003 | Lys et al. |
| 5,614,788 A | 3/1997 | Mullins et al. | | 6,608,453 B1 | 8/2003 | Morgan et al. |
| 5,621,282 A | 4/1997 | Haskell | | 6,624,597 B1 | 9/2003 | Dowling et al. |
| 5,634,711 A | 6/1997 | Kennedy et al. | | 6,639,574 B1 | 10/2003 | Scheibe |
| 5,640,061 A | 6/1997 | Bornhorst et al. | | 2001/0033488 A1 | 10/2001 | Chliwnyj et al. |
| 5,642,129 A | 6/1997 | Zavracky et al. | | 2002/0004423 A1 | 1/2002 | Minami et al. |
| 5,656,935 A | 8/1997 | Havel | | 2002/0038157 A1 | 3/2002 | Dowling et al. |
| 5,673,059 A | 9/1997 | Zavracky et al. | | 2002/0044066 A1 | 4/2002 | Dowling et al. |
| 5,701,058 A | 12/1997 | Roth | | 2002/0047569 A1 | 4/2002 | Dowling et al. |
| 5,712,650 A | 1/1998 | Barlow | | 2002/0047624 A1 | 4/2002 | Stam et al. |
| 5,721,471 A | 2/1998 | Begemann et al. | | 2002/0048169 A1 | 4/2002 | Dowling et al. |
| 5,734,590 A | 3/1998 | Tebbe | | 2002/0057061 A1 | 5/2002 | Mueller et al. |
| 5,751,118 A | 5/1998 | Mortimer | | 2002/0070688 A1 | 6/2002 | Dowling et al. |
| 5,752,766 A | 5/1998 | Bailey et al. | | 2002/0074559 A1 | 6/2002 | Dowling et al. |
| 5,769,527 A | 6/1998 | Taylor et al. | | 2002/0078221 A1 | 6/2002 | Blackwell et al. |
| 5,803,579 A | 9/1998 | Turnbull et al. | | 2002/0101197 A1 | 8/2002 | Lys et al. |
| 5,808,689 A | 9/1998 | Small | | 2002/0130627 A1 | 9/2002 | Dowling et al. |
| 5,821,695 A | 10/1998 | Vilanilam et al. | | 2002/0145394 A1 | 10/2002 | Morgan et al. |
| 5,836,676 A | 11/1998 | Ando et al. | | 2002/0145869 A1 | 10/2002 | Dowling |
| 5,848,837 A | 12/1998 | Gustafson | | 2002/0152045 A1 | 10/2002 | Dowling et al. |
| 5,850,126 A | 12/1998 | Kanbar | | 2002/0153851 A1 | 10/2002 | Dowling et al. |
| 5,851,063 A | 12/1998 | Doughty et al. | | 2002/0158583 A1 | 10/2002 | Lys et al. |
| 5,852,658 A | 12/1998 | Knight et al. | | 2002/0163316 A1 | 11/2002 | Dowling et al. |
| RE36,030 E | 1/1999 | Nadeau | | 2002/0171365 A1 | 11/2002 | Morgan et al. |
| 5,859,508 A | 1/1999 | Ge et al. | | 2002/0171377 A1 | 11/2002 | Mueller et al. |
| 5,896,010 A | 4/1999 | Mikolajczak et al. | | 2002/0171378 A1 | 11/2002 | Morgan et al. |
| 5,912,653 A | 6/1999 | Fitch | | 2002/0176259 A1 | 11/2002 | Ducharme |
| 5,923,363 A | 7/1999 | Elberbaum | | 2002/0195975 A1 | 12/2002 | Dowling et al. |
| 5,923,825 A * | 7/1999 | Orlicki et al. ............. 358/1.12 | | 2003/0011538 A1 | 1/2003 | Lys et al. |
| 5,924,784 A | 7/1999 | Chliwnyj et al. | | 2003/0028260 A1 | 2/2003 | Blackwell |
| 5,927,845 A | 7/1999 | Gustafson et al. | | 2003/0057884 A1 | 3/2003 | Dowling et al. |
| 5,945,988 A | 8/1999 | Williams et al. | | 2003/0057886 A1 | 3/2003 | Lys et al. |
| 5,946,209 A | 8/1999 | Eckel et al. | | 2003/0057887 A1 | 3/2003 | Dowling et al. |
| 5,952,680 A | 9/1999 | Strite | | 2003/0057890 A1 | 3/2003 | Lys et al. |
| 5,959,547 A | 9/1999 | Tubel et al. | | 2003/0076281 A1 | 4/2003 | Morgan et al. |
| 5,963,185 A | 10/1999 | Havel | | 2003/0100837 A1 | 5/2003 | Lys et al. |
| 5,974,553 A | 10/1999 | Gandar | | 2003/0133292 A1 | 7/2003 | Mueller et al. |
| 5,980,064 A | 11/1999 | Metroyanis | | 2003/0137258 A1 | 7/2003 | Piepgras et al. |
| 6,008,783 A | 12/1999 | Kitagawa et al. | | 2003/0189412 A1 | 10/2003 | Cunningham |
| 6,016,038 A | 1/2000 | Mueller et al. | | | | |
| 6,018,237 A | 1/2000 | Havel | | FOREIGN PATENT DOCUMENTS | | |
| 6,025,550 A | 2/2000 | Kato | | | | |
| 6,031,343 A | 2/2000 | Recknagel et al. | | AU | 6 267 9 | 12/1996 |
| 6,068,383 A | 5/2000 | Robertson et al. | | CA | 2 178 432 | 12/1996 |
| 6,069,597 A | 5/2000 | Hansen | | DE | 20018865 U1 | 3/2001 |
| 6,072,280 A | 6/2000 | Allen | | EP | 0495305 A2 | 7/1992 |
| 6,095,661 A | 8/2000 | Lebens et al. | | EP | 0534710 B1 | 1/1996 |
| 6,097,352 A | 8/2000 | Zavracky et al. | | EP | 0752632 A2 | 1/1997 |
| 6,132,072 A | 10/2000 | Turnbull et al. | | EP | 0752632 A3 | 8/1997 |
| 6,135,604 A | 10/2000 | Lin | | EP | 0823812 A2 | 2/1998 |
| 6,150,774 A | 11/2000 | Mueller et al. | | EP | 0903169 A2 | 3/1999 |
| 6,166,496 A | 12/2000 | Lys et al. | | EP | 0935234 A1 | 8/1999 |
| 6,175,201 B1 | 1/2001 | Sid | | EP | 0942631 A2 | 9/1999 |
| 6,181,126 B1 | 1/2001 | Havel | | EP | 1020352 A2 | 7/2000 |
| 6,183,086 B1 | 2/2001 | Neubert | | EP | 1113215 A2 | 7/2001 |
| 6,184,628 B1 | 2/2001 | Ruthenberg | | EP | 1130554 A2 | 9/2001 |
| 6,196,471 B1 | 3/2001 | Ruthenberg | | FR | 2 640 791 | 6/1990 |
| 6,211,626 B1 | 4/2001 | Lys et al. | | FR | 88 17359 | 12/1998 |
| 6,215,409 B1 | 4/2001 | Blach | | GB | 2045098 A | 10/1980 |
| 6,250,774 B1 | 6/2001 | Begemann et al. | | GB | 2135536 A | 8/1984 |
| 6,273,338 B1 | 8/2001 | White | | GB | 2176042 A | 12/1986 |
| 6,292,901 B1 | 9/2001 | Lys et al. | | GB | 2327047 A | 1/1999 |
| 6,310,590 B1 | 10/2001 | Havel | | JP | 01-31240 B2 | 2/1989 |
| 6,321,177 B1 | 11/2001 | Ferrero et al. | | JP | 03045166 | 2/1991 |
| 6,323,832 B1 | 11/2001 | Nishizawa et al. | | JP | 06043830 | 2/1994 |
| 6,329,764 B1 | 12/2001 | van de Ven | | JP | 7-39120 | 7/1995 |
| 6,340,868 B1 | 1/2002 | Lys et al. | | JP | 8-106264 | 4/1996 |
| 6,379,244 B1 | 4/2002 | Sagawa et al. | | JP | 08007611 | 12/1996 |
| 6,459,919 B1 | 10/2002 | Lys et al. | | JP | 09-139289 | 5/1997 |
| 6,525,683 B1 * | 2/2003 | Gu ............................ 341/140 | | JP | 9 320766 | 12/1997 |
| 6,528,954 B1 | 3/2003 | Lys et al. | | WO | WO 89/05086 | 6/1989 |
| 6,548,967 B1 | 4/2003 | Dowling et al. | | WO | WO 94/18809 | 8/1994 |
| 6,563,479 B1 | 5/2003 | Weindorf et al. | | WO | WO 95/13498 | 5/1995 |

| | | |
|---|---|---|
| WO | WO 96/41098 | 12/1996 |
| WO | WO 02/061328 A1 | 8/2002 |

OTHER PUBLICATIONS

* "LM117/LM317A/LM317 3-Terminal Adjustable Regulator", National Semiconductor Corporation, May 1997, pp. 1-20.
* "DS96177 RS-485 / RS-422 Differential Bus Repeater", National Semiconductor Corporation, Feb. 1996, pp. 1-8.
* "DS2003 / DA9667 / DS2004 High Current / Voltage Darlington Drivers", National Semiconductor Corporation, Dec. 1995, pp. 1-8.
* "LM140A / LM140 / LM340A / LM7800C Series 3—Terminal Positive Regulators", National Semiconductor Corporation, Jan. 1995, pp. 1-14.
* High End Systems, Inc., Trackspot User Manual, Aug. 1997, Excerpts (Cover, Title page, pp. ii through iii and 2-13 through 2-14).
* Artistic License, AL4000 DMX512 Processors, Revision 3.4, Jun. 2000, Excerpts (Cover, pp. 7,92 through 102).
* Artistic License, Miscellaneous Drawings (3 sheets) Jan. 12, 1995.
* Artistic License, Miscellaneous Documents (2 sheets Feb. 1995 and Apr. 1996).
* Newnes's Dictionary of Electronics, Fourth Edition, S.W. Amos, et al., Preface to First Edition, pp. 278-279.
*"http://www.luminus.cx/projects/chaser", (Nov. 13, 2000), pp. 1-16.
* Website Reference: Lamps & Gear Site, Announcing A New Industry Standard For Addressable Lighting Control Systems, 3 pages.

* cited by examiner

*Primary Examiner*—Haissa Philogene
(74) *Attorney, Agent, or Firm*—Wolf, Greenfield & Sacks, P.C.

(57) ABSTRACT

Provided are methods and systems for controlling the conversion of data inputs to a computer-based light system into lighting control signals. The methods and systems include facilities for controlling a nonlinear relationship between data inputs and lighting control signal ouputs. The nonlinear relationship may be programmed to account for varying responses of the viewer of a light source to different light source intensities.

34 Claims, 5 Drawing Sheets

SYSTEMS AND METHODS FOR CONTROLLING ILLUMINATION SOURCES

CROSS REFERENCE TO RELATED APPLICATIONS

This application claims the benefit under 35 U.S.C. §120 as a continuation (CON) of U.S. Non-provisional application Ser. No. 10/174,499, filed Jun. 17, 2002, entitled Systems and Methods for Controlling Illumination Sources."

Ser. No. 10/174,499 in turn claims the benefit of the following U.S. Provisional Applications:

Ser. No. 60/298,471, filed Jun. 15, 2001, entitled "Systems and Methods for Controlling Illumination Sources;"

Ser. No. 60/301,692, filed Jun. 28, 2001, entitled "Systems and Methods for Networking LED Lighting Systems";

Ser. No. 60/328,867, filed Oct. 12, 2001, entitled "Systems and Methods for Networking LED Lighting Systems;" and Ser. No. 60/341,476, filed Oct. 30, 2001, entitled "Systems and Methods for LED Lighting."

Ser. No. 10/174,499 also claims the benefit under 35 U.S.C. §120 as a continuation-in-part (CIP) of U.S. Non-provisional application Ser. No. 09/971,367, filed Oct. 4, 2001, entitled "Multicolored LED Lighting Method and Apparatus," which is a continuation of U.S. Non-provisional application Ser. No. 09/669,121, filed Sep. 25, 2000, entitled "Multicolored LED Lighting Method and Apparatus," which is a continuation of U.S. Ser. No. 09/425,770, filed Oct. 22, 1999, now U.S. Pat. No. 6,150,774, which is a continuation of U.S. Ser. No. 08/920,156, filed Aug. 26, 1997, now U.S. Pat. No. 6,016,038.

Ser. No. 10/174,499 also claims the benefit under 35 U.S.C. §120 as a continuation-in-part (CIP) of the following U.S. Non-provisional Applications:

Ser. No. 09/870,193, filed May 30, 2001, entitled "Methods and Apparatus for Controlling Devices in a Networked Lighting System;"

Ser. No. 09/215,624, filed Dec. 17, 1998, entitled "Smart Light Bulb," which in turn claims priority to the following U.S. Provisional Applications:

Ser. No. 60/071,281, filed Dec. 17, 1997, entitled "Digitally Controlled Light Emitting Diodes Systems and Methods;"

Ser. No. 60/068,792, filed Dec. 24, 1997, entitled "Multi-Color Intelligent Lighting;"

Ser. No. 60/078,861, filed Mar. 20, 1998, entitled "Digital Lighting Systems;"

Ser. No. 60/079,285, filed Mar. 25, 1998, entitled "System and Method for Controlled Illumination;" and Ser. No. 60/090,920, filed Jun. 26, 1998, entitled "Methods for Software Driven Generation of Multiple Simultaneous High Speed Pulse Width Modulated Signals;"

Ser. No. 09/213,607, filed Dec. 17, 1998, entitled "Systems and Methods for Sensor-Responsive Illumination;"

Ser. No. 09/213,189, filed Dec. 17, 1998, entitled "Precision Illumination;"

Ser. No. 09/213,581, filed Dec. 17, 1998, entitled "Kinetic Illumination;"

Ser. No. 09/213,540, filed Dec. 17, 1998, entitled "Data Delivery Track;"

Ser. No. 09/333,739, filed Jun. 15, 1999, entitled "Diffuse Illumination Systems and Methods;"

Ser. No. 09/815,418, filed Mar. 22, 2001, entitled "Lighting Entertainment System," which is a continuation of U.S. Ser. No. 09/213,548, filed Dec. 17, 1998, now U.S. Pat. No. 6,166,496;

Ser. No. 10/045,604, filed Oct. 23, 2001, entitled "Systems and Methods for Digital Entertainment;" which in turn claims priority to the following U.S. Provisional Applications:

Ser. No. 60/277,911, filed Mar. 22, 2001, entitled "Systems and Methods for Digital Entertainment;"

Ser. No. 60/242,484, filed Oct. 23, 2000, entitled, "Systems and Methods for Digital Entertainment;"

Ser. No. 60/262,022, filed Jan. 16, 2001, entitled, "Color Changing LCD Screens;"

Ser. No. 60/262,153, filed Jan. 17, 2001, entitled, "Information Systems;"

Ser. No. 60/268,259, filed Feb. 13, 2001, entitled, "LED Based Lighting Systems for Vehicles;"

Ser. No. 09/989,095, filed Nov. 20, 2001, entitled "Automotive Information Systems," which in turn claims priority to the following U.S. Provisional Applications:

Ser. No. 60/252,004, filed Nov. 20, 2000, entitled, "Intelligent Indicators;" and Ser. No. 60/296,219, filed Jun. 6, 2001, entitled, "Systems and Methods for Displaying Information;"

Ser. No. 09/989,747, filed Nov. 20, 2001, entitled "Packaged Information Systems;" and Ser. No. 09/989,677, filed Nov. 20, 2001, entitles "Information Systems."

Each of the foregoing applications is hereby incorporated herein by reference.

BACKGROUND OF THE INVENTION

1. Field of the Invention

This disclosure relates to the field of illumination, and more particularly to the field of illumination sources controlled by a computer.

2. Description of the Related Art

LED lighting systems are used in a variety of applications to provide light, including for illumination, display and indication. One method of operating an LED in these systems is through pulse width modulation (PWM). That is, the current through the LED is fixed at a desired level and the duration the LED is activated varies to generate the appearance that the LED is dimming or increasing in intensity. The human eye integrates light it receives, and if the LED is on for a very short period of time, the LED appears dim even though the LED was operated at its optimum current. Another method of operating LEDs is through analog techniques where the amplitude of either the voltage or the current is modulated to change the light output of the LEDs. There are other techniques for operating LEDs, for example amplitude modulation of a pulsed signal or other techniques for modulating the power dissipated by the LED per unit of time. Certain techniques for the computer control of LEDs to generate illumination are disclosed in U.S. Pat. No. 6,016,038, which is hereby incorporated by reference.

One of the problems with changing the apparent or actual light output of an LED from a low light level to a higher light level is that the output changes may appear as stepped function rather than a smooth transition. This is common to other light sources, besides LEDs, as well. This is because the eye is highly sensitive to discrete changes in light output at low light levels. When the light is changed from one low light output level to another low light output level, the eye perceives the change as stepped. It would be useful to provide a lighting system that reduced the apparent stepped transition in light output from such a lighting system.

SUMMARY

Provided herein are methods and systems for providing control signals for lights and light systems. The methods and systems include methods and systems for accessing a control module for generating an output control signal to control the output of a light, providing a conversion module for converting a data input to the output control signal, determining the response of a viewer to different levels of output of the light, and converting data inputs to output control signals in a nonlinear relationship to account for the response of a viewer to different levels of output of the light.

The methods and systems can include relationships in which the changes in the output control signal are smaller a low levels of light output and larger at higher levels of light output and methods and systems wherein the ratio of the output control signal to the data input increases continuously throughout the intensity range of the light.

The relationship between the data input and the output control signal can be a continuously increasing relationship. The relationship between the data input and the output control signal can be based on a function, such as an exponential function, a quadratic function, a squared function, a cubed function or other function.

The light may be an LED, and the ouput control signal can be a pulse width modulation (PWM) signal.

The ratio of the output control signal to the data input can increase continuously throughout the intensity range of the light.

The relationship between the data input and the output control signal can comprise multiple relationships, such as two linear relationships of different slopes or a linear relationship and a non-linear relationship. Where two linear relationships are used, one can apply to lower levels of data input with a lower slope than a second relationship that applies to higher levels of data input and that has a higher slope. Where there is a linear relationship and a nonlinear relationship, they can apply to different data ranges, and the nonlinear relationship can be based on a function, such as a an exponential function, a quadratic function, a squared function, a cubed function, or any other function.

The relationships used herein can account for the responses viewers to lights and illumination sources, such as those having LEDs of colors of different frequency ranges, such as red, green, blue, white, UV, IR, and amber LEDs. In embodiments the viewer response can be calculated based on reflected illumination, such as that reflected from a white surface, a wall, a colored surface, a mirror, a lens, or any other element. The relationships can be used to account for viewer responses to color-mixed light ouput. The color-mixed ouput can come from LEDs, such as red, green, blue, white, UV, IR, and/or amber LEDs.

The methods and systems disclosed herein also include methods and systems for providing a lighting control signal and may include methods and systems for providing a processor, providing memory, providing a light, providing a data input, providing a user interface, and using the processor to access a table stored in the memory to determine a control signal for the light, wherein the processor accesses the table to determine the control signal and wherein the table stores a nonlinear relationship between the data input and the control signal. The table can store a function that defines the nonlinear relationship. A user interface can allow a user to modify a parameter of the function, such as a PWM parameter and/or a scaling factor. In embodiments the user interface can allow a user to modify the table or select one or more tables from a plurality of tables. A function can define the relationship between the data input and the control signal, and can cause the ouput signal to increase continually in increasing amounts throughout the range of the data input.

Also provided herein are methods and systems of providing a conversion module having a processor for applying a nonlinear relationship to convert a data input to an ouput control signal for the light to account for the response of a viewer of the light to varying light levels.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

Figure 1:
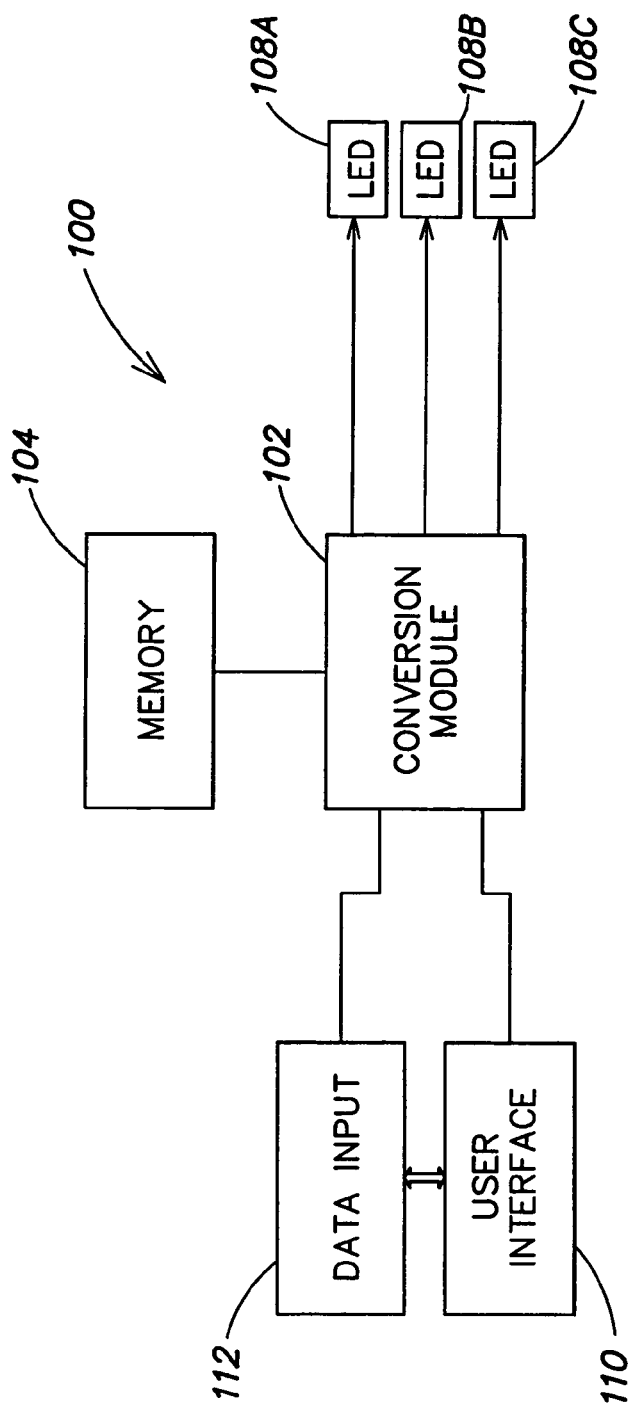
FIG. 1 is a schematic diagram depicting components for a system for controlling the ouput of a light system that is capable of receiving a data input.

Referring to FIG. 1, in an embodiment, a lighting system 100 may generate light in response to control signals that are generated upon receipt of data. In embodiments the lighting system 100 includes one or more lights 108A, 108B, 108C, which may be LEDs of different colors, such as white, red, green, blue, amber, UV, IR or the like. In embodiments the LEDs 108 light at different intensities in response to control signals, currents, or the like, such as pulse width modulation (PWM) control signals. The lighting system 100 optionally has a data input 112. As data inputs 112, such systems may receive the data via a network, an interface card, a USB facility, a serial data facility, a wireless data facility, a radio frequency facility, a receiver, a telecommunications facility, a power line, a wire, a circuit, a bus, or through computer-based methods, such as from internal or external memory 104, for example. Several examples of LED-based lighting systems can be found in U.S. Pat. Nos. 6,016,038 and 6,166,496, which are hereby incorporated by reference. The receipt of data into a lighting system can take many forms and it should be understood that the present invention is not limited to the methods described herein.

Referring still to FIG. 1, upon receipt of data, the lighting system 100 may change the light generated by the lighting system 100. For example, at a given time the lighting system may be generating a low level of light, then at a later time new data may indicate that the level should be increased or decreased.

In an embodiment a lighting system 100 may have a conversion module 102 that converts a data signal or input 112 into a given control signal or signals to control the lights 108. After receipt of the data 112, the output signal of the conversion module 102 may be a converted signal that would be used to control the LED or plurality of LEDs. The conversion module 102 may consist of a processor, as well as various hardware, firmware and software elements that are conventionally used to convert data inputs 112 into control signals or currents that are sent to the lights 108. In embodiments, the light system 100 may include a user interface 110, which may be used to control the data inputs 112 or may be used to program or otherwise control the conversion module 102. Thus, the conversion module 102 may be programmable, so that the conversion of a given data input 112 to a control signal can be varied by a user over time. The user interface 110 may be a computer, a dial, a switch, a power-cycle facility, or a wide variety of different kinds of user interfaces. In an embodiment the user interface 110 is a user interface for a computer, such a a keypad, mouse and display.

In an embodiment, the control signal can be a pulse width modulation (PWM) control signal and the conversion module can be a table that correlates particular data inputs to particular PWM control signal outputs that are sent to the lights 108.

Figure 2:
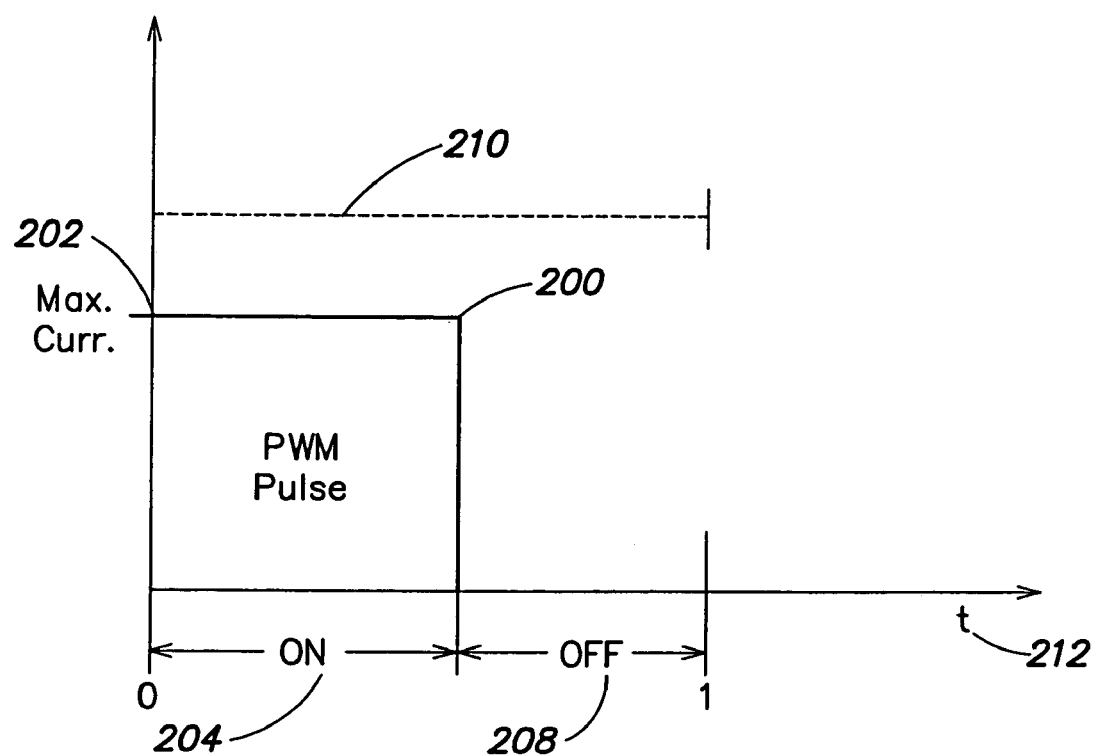
FIG. 2 is a schematic diagram of elements of a pulse width modulation control signal.

Referring to FIG. 2, in PWM, the output of a current source is divided over a period of time 212 into PWM pulses 200, which have an "on" phase 204 and an "off" phase 208. Thus, for a device that runs at an optimal current 202, the PWM signal delivers that current but is only on for a portion of a potential pulse time 210. Over many cycles of pulse time 210, PWM-driven devices effectively "integrate" the "on" phases 204 and produce an output that reflects the ratio of "on" time to "off" time. Light sources such as LEDs are an example of a device that can be driven by a PWM signal. A given pulse width of PWM signal is "integrated" by the eye to achieve perceived light of a wide range of apparent intensities, even though the current to the light source is either at the desired level or is turned off at any point in time. Many variants of PWM are known to those of ordinary skill in the art and are described in the pending applications that are referenced above and incorporated by reference herein.

Figure 3:
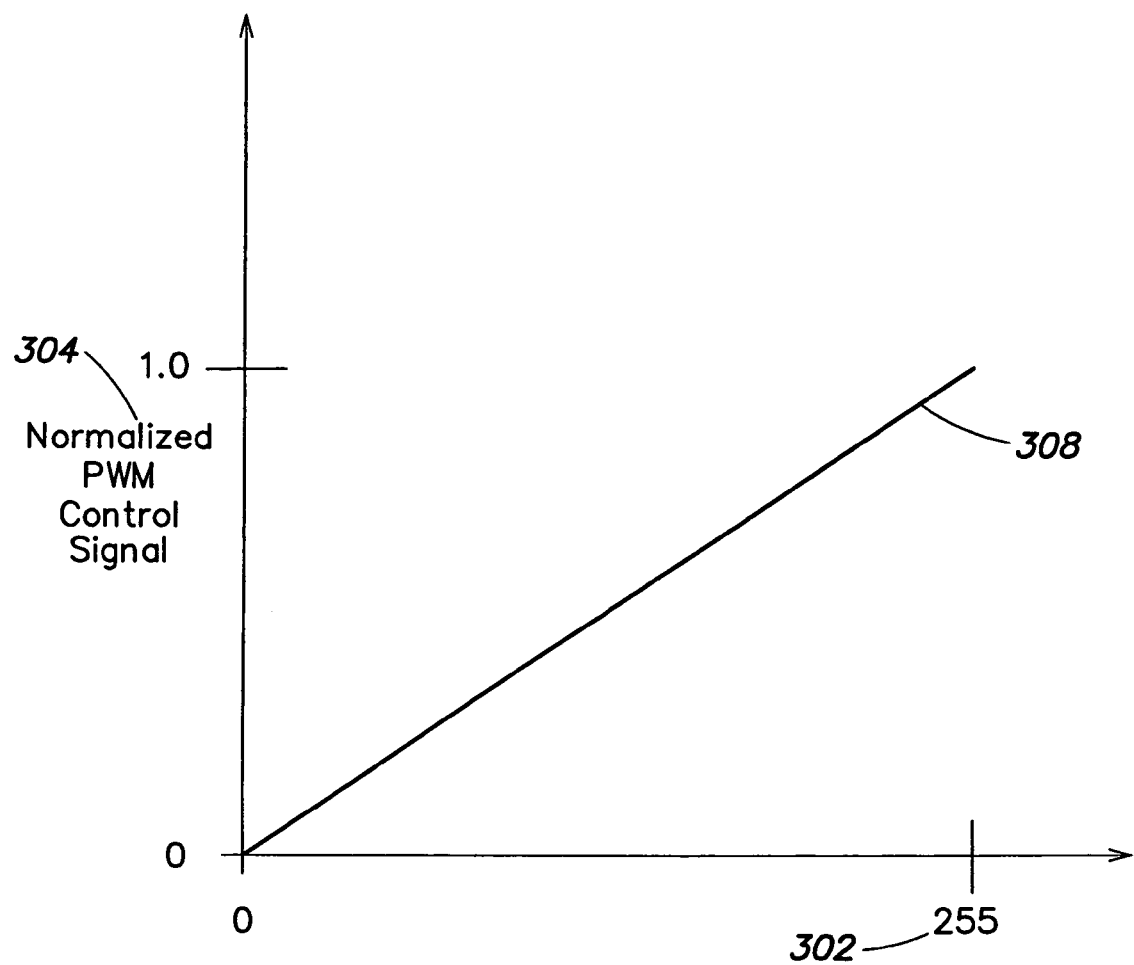
FIG. 3 illustrates a linear relationship between a data input and a lighting control output signal.

In a PWM-based system, a conventional table serving as a conversion module 102 would provide a linear correlation between the data and the output PWM control signals. For example, in an 8-bit system, the data may comprise 256 steps ($2^8$) and the table would contain 256 linearly progressing PWM control signals, or data indicative of such control signals. As a result, the system can control a given LED or plurality of LEDs with 256 steps of resolution with an 8-bit system. FIG. 3 illustrates the relationship 308 of received data 302 to the activation duration of a PWM signal 304 of a conventional system. One can readily observe the linear nature of the relationship 308.

Figure 4:
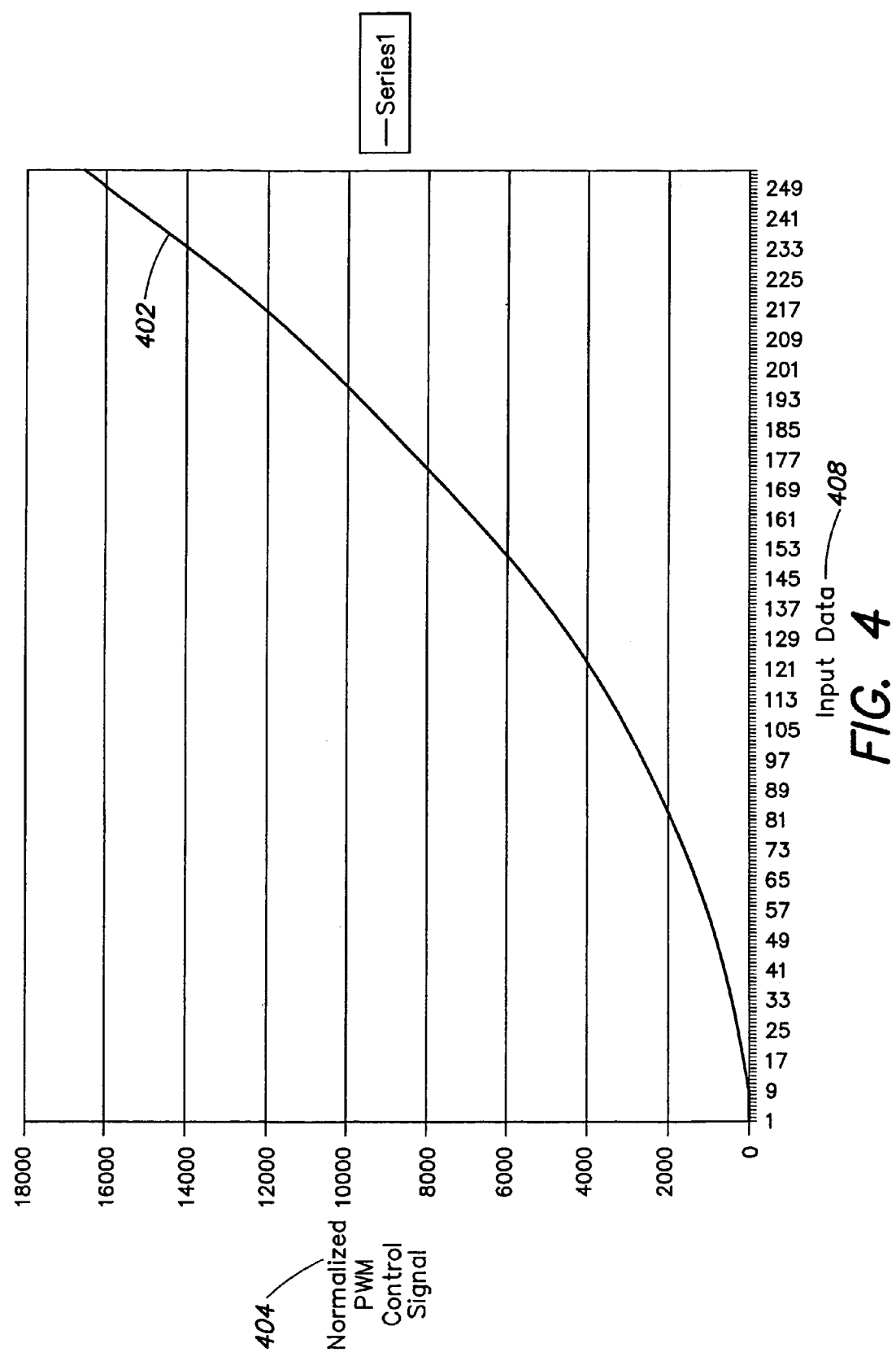
FIG. 4 illustrates a non-linear relationship between a data input and a lighting control ouput signal.

In certain applications, the linear relationship 308 has a tendency to generate perceptible stepping when data changes are made in the lower values. The eye is very sensitive to illumination changes at low levels of illumination intensity, and, as a result, changes in the illumination conditions at those intensity levels may cause perceived flicker or stepping. A system according to the principles of the present invention may have a non-linear relationship between the data received and the PWM control signal duration. FIG. 4 illustrates such a relationship 402. In an embodiment, the relationship 402 may be relatively flat in the low data values with increasing slope as the data values increase. In an embodiment, the slope may continuously increase throughout the intensity range of the light 108. This increasing non-linear relationship 402 generates much finer control over the low LED intensities and as a result reduces the perceived flicker of the LEDs. This relationship also generates less resolution in the higher data values such that the range of LED intensities can still be as large as the linear relationship 308. For example, an LED system with a non-linear relation 402 may be used to provide high resolution control over low light levels but still allow the system to achieve high light levels. This gives the appearance of an overall higher resolution system. This is due in part because the lower resolution changes in the upper portion of the curve 402 do not result in perceived flicker due to the higher illumination levels. A user may feel as though the 8-bit system has been converted into a 16-bit system. In an embodiment, a non-linear relationship 402 may be used to increase the overall range of control while maintaining acceptable performance throughout the entire operating range. For example, the PWM range may appear to span 4095 steps (12 bit resolution), 16383 steps (14 bits) or other resolution with only 255 (8-bit) data input. It should be understood that other data and other PWM resolutions may be used and these illustrative embodiments should not be used to limit the present invention in anyway. FIG. 4 illustrates a non-linear relationship 402 with input data 408 represented on the horizontal axis (represented as 8 bit data) and 14 bit control data, 404, represented on the vertical axis, with higher resolution of output data at lower values of input data. Thus, it is possible to generate values of less than one for low channels of input data.

Figure 5:
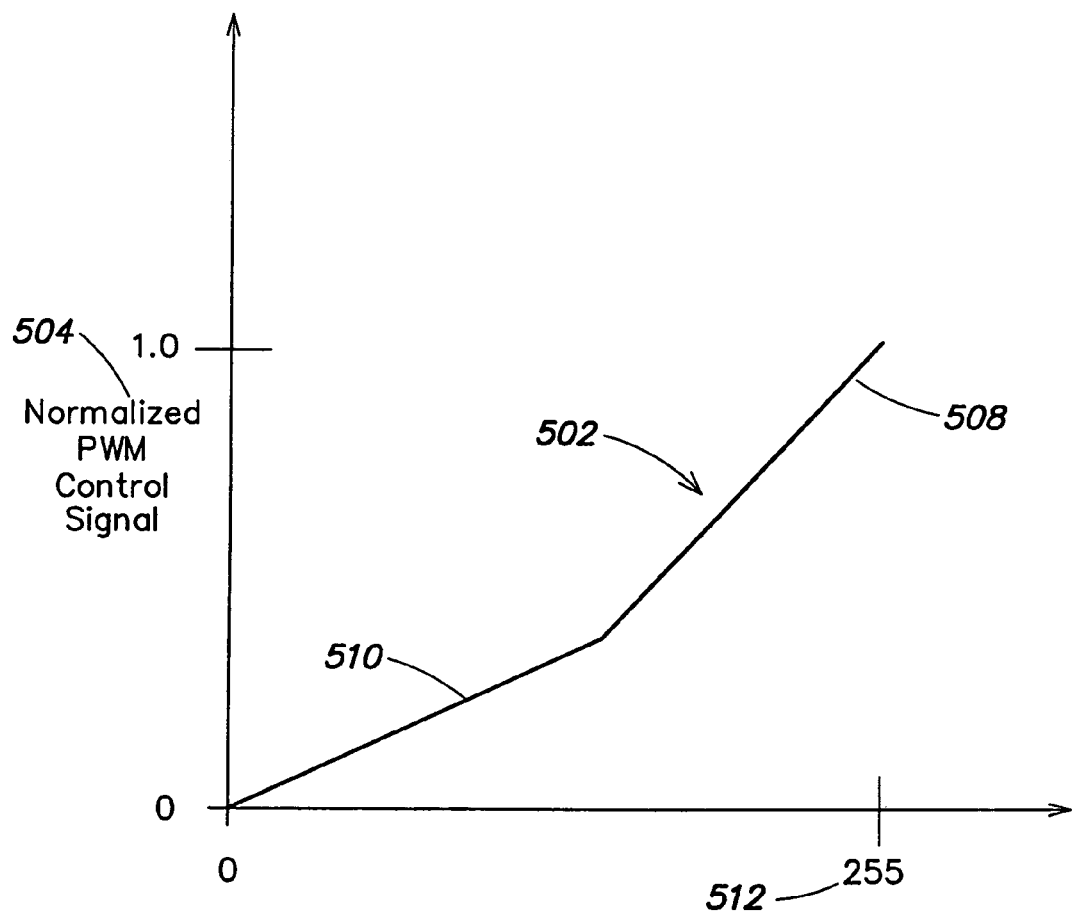
FIG. 5 illustrates a two-part relationship between a data input and a lighting control output signal.

The relationship 402 may be an exponential, quadratic, squared, cubed or other non-linear function that increases the intensity at a greater rate with increasing light intensities. The relationship does not need to be a continuous function and may be two or more linear functions. For example, referring to FIG. 5, a relationship 502 between input dat 512 and output control signals 504 may consist of a first linear function 510 and a second linear function 508. The first linear function 510 may have a small slope and be used to generate the relationship between the variables at low data levels. The second linear function 508 may be used, with a higher slope, to form the relationship in the higher portion of the curve.

In other embodiments, the relationship between input data and output control signals may be a combination between linear and non-linear functions or any other combination of functions or tables.

There are many ways of generating the non-linear relationship 402 and it should be understood that the relationship is not limited to the specific embodiments illustrated in FIG. 4. In an embodiment, the non-linear relationship may be a function that is generated on a conversion module 102 using a processor (illustrated in FIG. 1). The conversion module 102 may generate a PWM signal based on a function wherein the received data is a variable within the function. In another embodiment, the PWM signals, or data indicative of such signals, may be stored in a table or tables and, when data is received, the conversion module 102 may select a PMW signal that corresponds with the received data from the table and then communicate the signal to the lights 108. In an embodiment, the information or data contained in the table may be used by the processor of the conversion module 102 to generate a PWM signal or other control signal. In another embodiment, the data may be sent to the lighting device and the data may indicate how a PMW signal should be adjusted or generated before being communicated to an LED. It should be appreciated that there are many systems and methods that may be used to generate the non-linear effects described herein and the present invention is not limited in any way by the illustrative embodiments presented herein. In another embodiment, a code may be communicated to a conversion module 102 such that the conversion module 102 selects another table or function from memory 104 upon receipt of new data. This new table selection or function selection may then be used for the selection of PWM signals. In an embodiment, the code may also be used to provide other tables, functions, or modifications thereof and the code may be stored in non-volatile memory such that subsequently received data can be interpreted through the newly coded parameters.

Referring again to FIG. 1, FIG. 1 illustrates a lighting system 100 according, to the principles of the present invention. The system 100 may include a conversion module 102, memory 104, at least one light 108A, data input 112 and a user interface 110. The conversion module 102 may be a processor that is used to generate a function and/or select a value from a table that is stored in memory 104 and communicate control signals to the at least one light 108A. In an embodiment, the lighting system may also include a user interface 110. The user interface 110 may be used to modify a relationship 402, a function or a table. The user interface may also be used to select a table or function, for example. A light system 100 according to the principles of the present invention may be provided with factory-installed functions or tables and the user interface may be used to modify such settings. In an embodiment, the modification may be accomplished through adjustable scaling factors that are used to modify the relationship 402. For example, a lighting system may include a table with PWM signals as well as a scaling factor. The scaling factor may be used to modify the contents of all or a portion of the table. When shipped from the factory, the scaling factor may be set to unity but the scaling factor may be adjustable. In an embodiment, the scaling factor may be adjusted by communicating a new scaling factor to the data input 112. In an embodiment, the new scaling factor may replace the old scaling factor or the new scaling factor may be used to adjust the old scaling factor. For example, the system may take the new scaling factor and multiply it by the old scaling factor and the resultant factor may be used to adjust the contents of a table. The new scaling factor may be permanently or temporarily stored in the lighting system 100. In an embodiment, the lighting system 100 may receive data indicating which PWM signal to select from a table and the data may also contain a scaling factor. In an embodiment, a lighting system may download scaling factors, tables, functions or other information to change the relationship 402 through data input 112.

In an embodiment, a lighting system 100 may include two or more independently controllable lights 108A and 108B. The lights 108A and 108B may be LEDs that produce different colors when energized. In another embodiment, a lighting system may include three different colored individually controllable lights 108A, 108B, and 108C (for example, red, green and blue LEDs, respectively). In an embodiment, one or more of these may be combined with one or more white LEDs 108, such as white LEDs of different color temperature ranges. Each of these LEDs 108A, 108B, and 108C may be controlled by the processor of the conversion module 102 and the processor may select control signals to be communicated to the lights 108A, 108B, and 108C through a table or function, as described herein.

In an embodiment, the table may be comprised of control signal data and the conversion module 102 may generate control signals from the control signal data. In an embodiment, such a system, with two or more lights 108 operated in a non-linear fashion, may be used to produce color-changing effects. The non-linearity of the system may improve the color mixing abilities of the system. For example, with a linear relationship 308 used to control the separate LEDs, the color mixing at high light levels may not work as well as at the lower light levels. This is due in part to the fact that at high intensities a linearly progressing step does not change the light output by enough to visually change the illumination conditions or the color of the emitted light as perceived by the eye. In order to cause a perceptible change in the illumination or color of the emitted light, at the higher light levels, the control signal may need to be changed by more than a linearly progressing step. A non-linear relationship 402, according to the principles of the present invention, increases the difference in control signal steps at the high light levels and as a result may provide perceptible color or illumination changes with fewer steps. In an embodiment, a non-linear relationship 402 may result in higher resolution at the low light levels to minimize the apparent snapping from one light level to the next as well as provide for lower resolution in the higher light levels to provide perceptible color or illumination changes with fewer steps.

In an embodiment, a program may be executed that is associated with the conversion module 102 wherein data (such as in an 8-bit input system that provides 256 steps of data) is communicated to the input 112 of a lighting system 100 and this data causes the conversion module 102 to generate, either by table or function or by other methods, a control signal to at least one light 108A. The relationship between the data and the control signals may be non-linear 402 such that high resolution is provided at low light levels and low resolution is provided at high light levels. In an embodiment three channels of such data may be communicated to the conversion module 102 through input 112 and the conversion module 102 may generate three lighting control signals in response. A system according to the principles of the present invention may be used to provide illumination, white illumination of a varying color temperature, colored illumination, color changing effects or other illumination or display conditions. A lighting system 100 may control the individual lights 108, such as LEDs, with a relationship 402 as illustrated in FIG. 4, for example. The control signals communicated to each of the lights 108A, 108B and 108C in the lighting system 100 may be generated using the same table, set of tables or functions or may be controlled through a different table, set of tables or function.

While many of the embodiments described herein relate to LED systems, the systems and methods taught by the present invention may relate to other illumination sources as well. As used herein, the term "LED" means any system that is capable of receiving an electrical signal and producing a color of light in response to the signal. Thus, the term "LED" should be understood to include light emitting diodes of all types, light emitting polymers, semiconductor dies that produce light in response to current, organic LEDs, electroluminescent strips, and other such systems. In an embodiment, an "LED" may refer to a single light emitting diode having multiple semiconductor dies that are individually controlled. It should also be understood that the term "LED" does not restrict the package type of the LED. The term "LED" includes packaged LEDs, nonpackaged LEDs, surface mount LEDs, chip on board LEDs and LEDs of all other configurations. The term "LED" also includes LEDs packaged or associated with material (e.g. a phosphor) wherein the material may convert energy from the LED to a different wavelength.

While many of the illustrative embodiments described herein relate to PWM control, the systems and methods taught by the present invention may relate to other illumination control techniques as well. Thus, the term "pulse width modulation" or "PWM" should be understood to encompass all control techniques used in modulating the intensity of an illumination source. For example, when controlling an LED with analog voltage control, the control signal may be changed to change the illumination from the LED and the rate at which this control signal is changed may be accomplished using systems or methods taught by the present invention.

An LED system is one type of light or illumination source. As used herein "light" and "illumination source" should each be understood to include all light and illumination sources, including LED systems, as well as incandescent sources, including filament lamps, pyro-luminescent sources, such as flames, candle-luminescent sources, such as gas mantles and carbon arc radiation sources, as well as photo-luminescent sources, including gaseous discharges, fluorescent sources, phosphorescence sources, lasers, electro-luminescent sources, such as electro-luminescent lamps, light emitting diodes, and cathode luminescent sources using electronic satiation, as well as miscellaneous luminescent sources including galvano-luminescent sources, crystallo-luminescent sources, kine-luminescent sources, thermo-luminescent sources, triboluminescent sources, sonoluminescent sources, and radioluminescent sources. Illumination sources may also include luminescent polymers capable of producing primary colors.

The term "illuminate" should be understood to refer to the production of a frequency of radiation by an illumination source. The term "color" should be understood to refer to any frequency of radiation within a spectrum; that is, a "color," as used herein, should be understood to encompass frequencies not only of the visible spectrum, but also frequencies in the infrared and ultraviolet areas of the spectrum, and in other areas of the electromagnetic spectrum.

All articles, patents, patent applications and other documents mentioned are hereby incorporated by reference. While the invention has been disclosed in connection with the embodiments shown and described in detail, various equivalents, modifications, and improvements will be apparent to one of ordinary skill in the art from the above description.

The invention claimed is:

1. A system to control a light, the system comprising:
   a user interface to control at least one nonlinear relationship between a data input and an output control signal for the light; and
   a conversion module that converts the data input to the output control signal using the at least one nonlinear relationship,
   wherein the at least one nonlinear relationship accounts for a response of a viewer to different intensities of the light.

2. The system of claim 1, further comprising a memory where a table is stored, the table comprising the at least one nonlinear relationship.

3. The system of claim 1, wherein the at least one nonlinear relationship comprises a function selected from a group consisting of an exponential function, a squared function, and a cubed function.

4. The system of claim 1, wherein the at least one nonlinear relationship comprises:
   a first linear relationship with a first slope; and
   a second linear relationship with a second slope that is different than the first slope.

5. The system of claim 4, wherein the first slope of the first linear relationship and the second slope of the second linear relationship are non-zero.

6. The system of claim 1, wherein the at least one nonlinear relationship includes a plurality of selectable nonlinear relationships, wherein the user interface is configured to select one nonlinear relationship of the plurality of selectable nonlinear relationships, and wherein the conversion module converts the data input to the output control signal using the selected one nonlinear relationship.

7. The system of claim 1, wherein the at least one nonlinear relationship accounts for the response of the viewer to reflected illumination.

8. The system of claim 1, wherein the at least one nonlinear relationship is continuously increasing.

9. The system of claim 1, wherein the user interface is adapted to modify the at least one nonlinear relationship, and wherein the conversion module converts the data input to the output control signal using the modified at least one nonlinear relationship.

10. The system of claim 1, wherein the output control signal is a pulse width modulated signal.

11. The system of claim 2, wherein the user interface is adapted to modify the table, and wherein the conversion module converts the data input to the output control signal using the modified table.

12. A method of controlling a light, the method comprising steps of:
    determining a response of a viewer to a change in an intensity of the light;
    operating the light based on a nonlinear relationship between data input steps and an output control signal that accounts for the response of the viewer; and
    adjusting the nonlinear relationship.

13. The method of claim 12, wherein the step of adjusting the nonlinear relationship further comprises a step of employing a user interface.

14. The method of claim 12, wherein the step of adjusting the nonlinear relationship occurs while the light is viewed by the viewer.

15. The method of claim 14, wherein the response of the viewer comprises a response to reflected illumination.

16. The method of claim 14, further comprising a step of storing the nonlinear relationship in a memory.

17. The method of claim 16, wherein the memory is included in a conversion module.

18. A method of controlling a light, the method comprising steps of:
    employing a multi-bit system;
    operating the light based on a nonlinear relationship between data input steps and an output control signal that accounts for a response of a viewer; and
    scaling the nonlinear relationship so as to minimize a change in intensity between adjacent data input steps corresponding to low light intensities and so as to maximize the change in intensity between adjacent data input steps corresponding to high light intensities,
    wherein the multi-bit system is a first size having a first quantity of bits, and
    wherein a range of adjustment of the light corresponds to a range of adjustment provided by a linear system employing a multi-bit system that has a second size having a second quantity of bits that is greater than the first quantity of bits.

19. The method of claim 18, wherein the second quantity of bits is at least 50% greater than the first quantity of bits.

20. The method of claim 19, wherein the range of adjustment is a range of intensity of the light.

21. An illumination apparatus, comprising:
at least one first LED configured to generate at least first radiation having a first spectrum, wherein the first radiation, when generated, provides illumination in an environment; and
at least one controller coupled to the at least one first LED to control a first intensity of the first radiation, the at least one controller further configured to:
receive a first X-bit lighting command representing a first value within a first control range for the first intensity;
convert the first X-bit lighting command to a first Y-bit lighting command representing a second value within the first control range for the first intensity, wherein X and Y are different integers, and wherein the second value in the first control range is related to the first value in the first control range based on a non-linear relationship; and
control the first intensity of the first radiation based at least in part on the second value in the first control range.

22. The apparatus of claim 21, further comprising:
at least one second LED configured to generate at least second radiation having a second spectrum different than the first spectrum, wherein the first radiation and the second radiation, when generated, provide the illumination in the environment,
and wherein the at least one controller is further configured to control a second intensity of the second radiation.

23. The apparatus of claim 22, wherein X is less than Y.

24. The apparatus of claim 23, wherein X is eight and wherein Y is at least fourteen.

25. The apparatus of claim 22, further comprising a memory to store at least one representation of the non-linear relationship, wherein the at least one representation includes at least one of a function and a table of values, and wherein the at least one controller utilizes the at least one representation to convert the first X-bit lighting command to the first Y-bit lighting command.

26. The apparatus of claim 25, wherein the non-linear relationship is a continuously increasing relationship.

27. The apparatus of claim 25, wherein the non-linear relationship includes at least two linear relationships having respective different slopes.

28. The apparatus of claim 25, wherein the non-linear relationship includes at least one linear portion over a first part of the first control range and at least one nonlinear portion over a second part of the first control range.

29. The apparatus of claim 25, wherein the non-linear relationship includes one of an exponential relationship, a quadratic relationship, and a cubed relationship.

30. The apparatus of claim 25, wherein the non-linear relationship has a relatively smaller slope for relatively smaller first values and a relatively higher slope for relatively higher first values.

31. The apparatus of claim 21, wherein the at least one first LED includes at least one white LED.

32. The apparatus of claim 22, wherein the at least one controller is further configured to:
receive a second X-bit lighting command representing a first value within a second control range for the second intensity;
convert the second X-bit lighting command to a second Y-bit lighting command representing a second value within the second control range for the second intensity, wherein the second value in the second control range is related to the first value in the second control range based on the non-linear relationship; and
control the second intensity of the second radiation based at least in part on the second value in the second control range.

33. The apparatus of claim 32, wherein the at least one first LED includes at least one white LED.

34. The apparatus of claim 33, wherein the illumination is essentially white, and wherein the at least one controller is configured to control a color temperature of the illumination based at least in part on the second value in the first control range and the second value in the second control range.

* * * * *

UNITED STATES PATENT AND TRADEMARK OFFICE
CERTIFICATE OF CORRECTION

| | |
|---|---|
| PATENT NO. | : 7,135,824 B2 |
| APPLICATION NO. | : 10/916018 |
| DATED | : November 14, 2006 |
| INVENTOR(S) | : Ihor A. Lys et al. |

It is certified that error appears in the above-identified patent and that said Letters Patent is hereby corrected as shown below:

Title Page should read
Item (63) Continuation of application No. 10/174,499, filed on Jun. 17, 2002, now Pat. No. 6,975,079, which is a continuation-in-part of application No. 09/971,367, filed on Oct. 4, 2001, now Pat. No. 6,788,011, which is a continuation of application No. 09/669,121, filed on Sep. 25, 2000, now Pat. No. 6,806,659, which is a continuation of application No. 09/425,770, filed on Oct. 22, 1999, now Pat. No. 6,150,774, which is a continuation of 08/920,156 filed Aug. 26, 1997, now Pat. No. 6,016,038, said application No. 10/174,499 is a continuation-in-part of application No. 09/870,193, filed on May 30, 2001, now Pat. No. 6,608,453, and a continuation-in-part of application No. 09/215,624, filed on Dec. 17, 1998, now Pat. No. 6,528,954, and a continuation-in-part of application No. 09/213,607, filed on Dec. 17, 1998, now abandoned, and a continuation-in-part of application No. 09/213,189, filed on Dec. 17, 1998, now Pat. No. 6,459,919, and a continuation-in-part of application No. 09/213,581, filed on Dec. 17, 1998, now Pat. No. 7,038,398, and a continuation-in-part of application No. 09/213,540, filed on Dec. 17, 1998, now Pat. No. 6,720,745, and a continuation-in-part of application No. 09/333,739, filed on Jun. 15, 1999, and a continuation-in-part of application No. 09/815,418, filed on Mar. 22, 2001, now Pat. No. 6,577,080, is a continuation of application No. 09/213,548, filed on Dec. 17, 1998, now Pat. No. 6,166,496, said application No. 10/174,499 and a continuation-in-part of application No. 10/045,604, filed on Oct. 23, 2001, and a continuation-in-part of application No. 09/989,095, filed on Nov. 20, 2001, now Pat. No. 6,717,376, and a continuation-in-part of application  No. 09/989,747, filed on Nov. 20, 2001, now Pat. No. 6,897,624, and a continuation-in-part of application No. 09/989,677, filed on Nov. 20, 2001.

Title Page should read
Item (60) Provisional application No. 60/301,692, filed on Jun. 28, 2001, provisional application No. 60/328,867, filed on Oct. 12, 2001, provisional application No. 60/071,281, filed on Dec. 17, 1997, provisional application No. 60/341,476, filed on Oct. 30, 2001, provisional application No. 60/068,792, filed on Dec. 24, 1997, provisional application No. 60/078,861, filed on Mar. 20, 1998, provisional application No. 60/079,285, filed on Mar. 25, 1998, provisional application No. 60/090,920, filed on Jun. 26, 1998, provisional application No. 60/277,911, filed on

UNITED STATES PATENT AND TRADEMARK OFFICE
CERTIFICATE OF CORRECTION

PATENT NO.         : 7,135,824 B2
APPLICATION NO.    : 10/916018
DATED              : November 14, 2006
INVENTOR(S)        : Ihor A. Lys et al.

It is certified that error appears in the above-identified patent and that said Letters Patent is hereby corrected as shown below:

Mar. 22, 2001, provisional application No. 60/242,484, filed on Oct. 23, 2000, provisional application No. 60/262,022 filed on Jan. 16, 2001, provisional application No. 60/262,153, filed on Jan. 17, 2001, provisional application No. 60/268,259, filed on Feb. 13, 2001, provisional application No. 60/252,004, filed on Nov. 20, 2000, provisional application No. 60/296,219, filed on Jun. 6, 2001, provisional application No. 60/298,471, filed on Jun. 15, 2001.

Signed and Sealed this

Twenty-first Day of July, 2009

JOHN DOLL
*Acting Director of the United States Patent and Trademark Office*